United States Patent Office 3,342,712
Patented Sept. 19, 1967

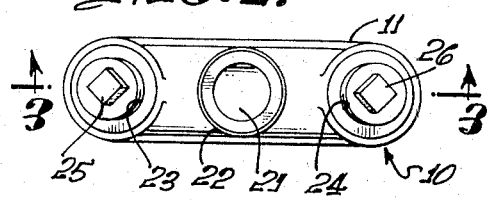
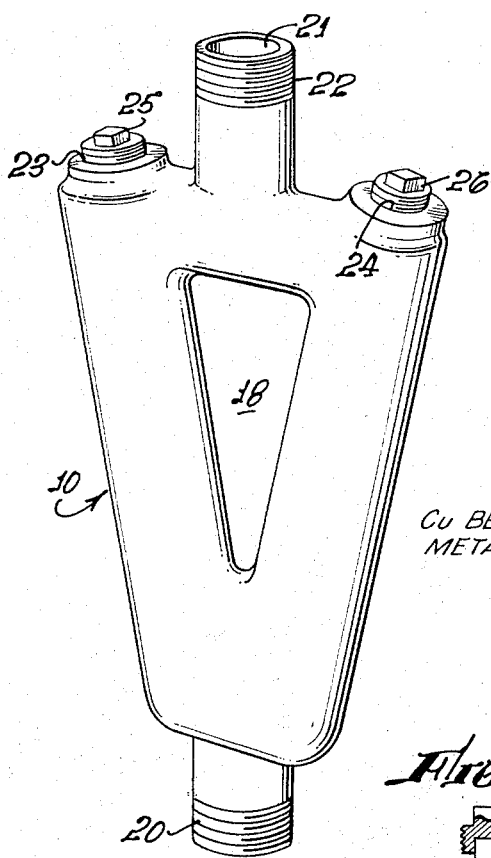
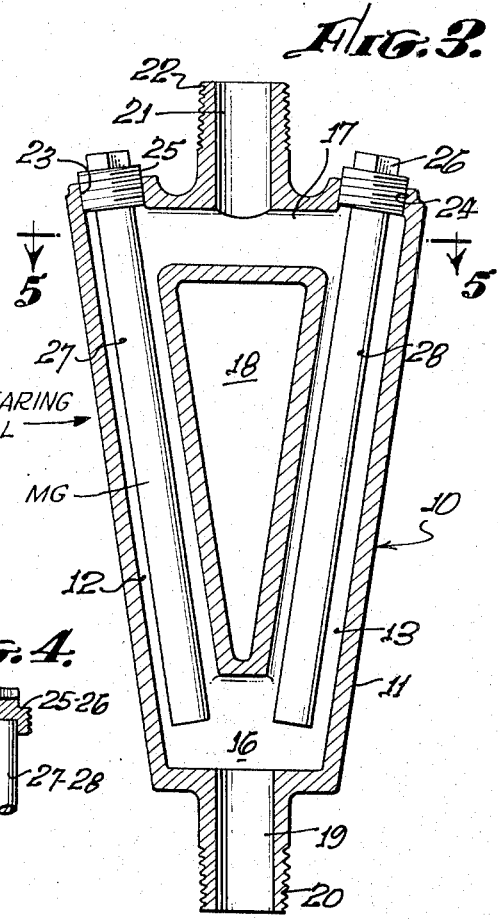
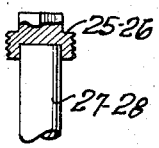
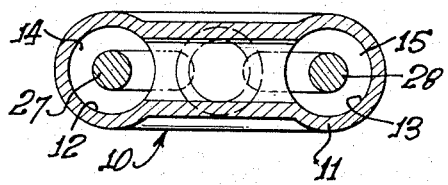
William O'Keefe, Sr.,
INVENTOR.

3,342,712
WATER CONDITIONING METHOD
AND APPARATUS
William O'Keefe, Sr., 407 Western Ave. S.,
Los Angeles, Calif. 90005
Filed Nov. 4, 1959, Ser. No. 161,325
6 Claims. (Cl. 204—148)

This application is a continuation-in-part of co-pending application Ser. No. 598,189, filed July 16, 1956, by William O'Keefe, Sr., titled Water Conditioner, now abandoned.

This invention relates to water treatment and more particularly treatment for reducing or eliminating scaling and corrosion.

Acid carbonates and water are decomposed by high temperature heating or prolonged heating into magnesium and calcium carbonates which are deposited upon the surfaces of metal containers and conduits, thereby forming hard scale. Such carbonates break down soaps and form a scum of magnesium or calcium stearates or salts of the fatty acids. This scum clings to utensils and vessels generally and even remains in clothing washed in such water.

A second difficulty of water systems is the matter of corrosion. It is generally recognized that corrosion results from an electrochemical process set up by many small galvanic cells present over the inner surface of tanks, pipes, fittings and appurtenances exposed to water or water moisture. These cells are formed by a difference in electrical potential from one area to another due to variation in the chemical composition of the metal. This causes a flow of current from the anodic areas to the cathodic areas, which dissolves the anodic spots or areas in an effort to fill the current requirements of the cathodic areas. Ultimately a neutralizing film is deposited which arrests the current flow, however, this film breaks down for various reasons and is soon washed away so that further corrosive action occurs. Certain ingredients in hard water and the chemical character of the metal often results in localizing the reaction to very small areas which then causes deep pitting and consequent tank failures. In soft water the reaction is frequently wide-spread such that large areas are affected where the zinc galvanizing is entirely dissolved. The bare steel oxidizes which causes red water to flow from the tank after a period of use.

The exact mechanisms which control corrosion in a given environment are complex and are not completely understood. However, various factors in corrosion control of water systems and the conditioning of water within the system can be utilized as an explanation whereby the method and apparatus of the present invention achieves proper conditioning of the water together with the control of corrosion throughout the system.

All metals when immersed in water have an inherent tendency to go into solution as positively charged ions and to release an equivalent number of electrons, but because the system must remain electrically neutral, the formation of ions can proceed only if there is neutralized an equivalent number of positive ions of some other substance which is also present in the system. When iron is immersed in water, positive hydrogen ions formed by normal ionization of water combine with electrons released by iron and the resulting hydrogen atoms unite to form hydrogen gas which immediately coats the iron surface with a thin, invisible film. The presence of this gas film insulates the iron from water and thus limits or prevents further reaction. Corrosion will proceed only if the hydrogen film is removed in some way, and this generally happens because the hydrogen gas film coalesces and escapes as bubbles, or because some other chemical reaction removes hydrogen. If dissolved oxygen is present in the water, the hydrogen atoms usually react directly with it and no hydrogen gas film ever forms as long as oxygen diffuses to the metal surface.

Since the reaction forming corrosion in a water system is electrical in nature it can be quantitively expressed in terms of an electromotive force referred to an arbitrary standard as zero. A large positive voltage indicates an extreme tendency for dissolution while a large negative voltage indicates no great tendency to dissolve. Since iron is above hydrogen in electrolytic solution tendency (thus having a great solution tendency) iron can displace hydrogen gas from solution. Magnesium has a greater tendency to dissolve in water and thus displace hydrogen than does iron and clean magnesium actually reacts rapidly with water to release hydrogen. On the other hand, copper has very little tendency to dissolve and, as is well known, copper pipes have excellent resistance to corrosive attack.

It is commonly recognized that dissimilarity of chemical composition of metals in contact with each other in conductive solution induces electromotive force differences which lead to a flow of electricity from the more corrodible (anodic) to the less corrodible (cathodic) metal. Thus, iron in contact with copper in natural water corrodes at a rapid rate: this is a common occurrence in domestic and industrial water systems where iron pipes or equipment must be fastened to copper tubes or fittings.

The process of corrision when dissimilar metals are connected occur in the same general way indicated above: however, an increase in rate of corrosion is observable because of greater freedom for reaction of electron with hydrogen ions. For example, when copper and iron are in contact, the greater electrolytic solution tendency of iron causes the following reaction to take place at first:

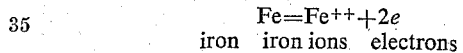

$$Fe = Fe^{++} + 2e$$
iron   iron ions   electrons then the iron ions immediately form a slimy skin of green ferrous hydroxide. However, the electrons travel to the copper metal where they combine with hydrogen ions from water to form hydrogen atoms which either are released as a gas or combine with oxygen. Thus, no thin film of hydrogen is formed at the site of corrosion on iron and the dissolution of iron can proceed rapidly.

Accordingly, it is an object of the present invention to induce an electromotive force within a water supply system by positioning a galvanic coupling in said system to prevent corrosion of the iron conduit of the system and to condition the water passing through the system.

It is another object of the present invention to provide a method and apparatus for controlling corrosion of iron in the system and conditioning the water passing therethrough.

It is another object of the present invention to provide a water conditioner having a galvanic couple with a minimum of electrical power loss which results from transfer of electrons from a magnesium anode.

It is another object of the present invention to provide a water conditioner which insures good electrical contact between the conditioner and the attached water distribution system.

It is another object of the present invention to provide a water conditioner having large surface areas of non-corrodible metal in the galvanic couple in close proximity one to the other and a large surface area of the anode in the galvanic couple to insure a relatively restricted water passage and a minimum of surface polarization whereby dissolution of the anode and maintenance of the high net potential required to guarantee protection of the attached iron system is promoted.

It is a further object of the present invention to provide a water conditioning apparatus which furnishes a high net electrical potential to overcome electrical pipe joint resistances over long distances to assure protection of the entire attached system.

It is another object of the present invention to provide a water conditioning apparatus which utilizes different metals in a galvanic couple in such a way that a large surface area of both the cathode and anode is exposed to turbulent action of water passing thereover to insure contact of the water with metal surfaces.

Yet a further object of the present invention is to provide such a water conditioning apparatus having a high electron density on the cathodic metal and intimate electric contact with the downstream portions of the water system.

It is a still further object of the present invention to provide a water conditioning apparatus which alters the chemical and physical composition of water passing therethrough to decrease the acidity and de-oxygenation of the water and an alteration of the ratio of the permanent to temporary hardness.

It is a still further object of the present invention to provide a water conditioning apparatus whereby sedimentation is reduced by the introduction of a protective colloid into the water.

A still further object of the present invention is to provide new and improved means for introducing an anodic rod into the flow stream of a water pipe system near its source of supply; and this is accomplished by the use of a special fitting having one or more rods of anodic material supported in the anterior thereof, which can be readily connected in a water pipe system at any suitable location, preferably near the source of supply.

The present invention comprises a method and apparatus for controlling the corrosion of an iron water conduit system and conditioning the water passing therethrough, by positioning within the conduit system a galvanic couple having an anodic material and cathodic material in intimate contact one with the other. The anodic material and cathodic material define relatively large surface areas in contact with water passing through the system. The cathodic material is in intimate electrical contact with the iron conduits of the system.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a perspective view of the invention in a presently preferred form;

FIGURE 2 is a top plan view of the invention;

FIGURE 3 is a vertical sectional view through the invention taken on the line 3—3 of FIGURE 2 in the direction indicated;

FIGURE 4 is a partial sectional view of one plug showing one end of one magnesium rod received therein; and FIGURE 5 is a horizontal cross-sectional view of the invention taken on line 5—5 of FIGURE 3.

Referring now to the drawing the method of the present invention can best be described in connection with an illustrative embodiment of the apparatus of the present invention as shown in FIGURES 1 through 5. The apparatus comprises in general a water conditioner designated by the numeral 10 having a body portion 11 adapted to be threadably inserted into the conduit of a water system (not shown) which conduits are most generally formed of iron or an iron alloy.

The center lines of the body 11 form an inverted truncated isosceles triangle consisting of two passages 12 and 13 which are circular in section, as shown in FIGURES 3 and 5. The circular passages extend upwardly at an angle from the enclosed or inner space 16 proximate the bottom of the body and are joined at the inner side of each near the top by the circular cross-passage 17 leaving the open space 18 in the body. An opening 19 is formed at the bottom in communication with the inner space 16 and is provided with a threaded end 20. There is also a top opening 21 formed on the cross-passage 17 and communicating therewith, which is provided with a threaded end 22. At the end of each of the upwardly extending passages there are similar threaded openings 23, 24 each of which is adapted to receive and support a male threaded plug 25, 26.

Anodic rods 27, 28 formed of magnesium in the presently prfeerred embodiment are mounted in each of the plugs as shown in FIGURES 3 and 4. When the threaded portions 25, 26 of the plugs are mounted in the respective openings 23, 24 the rods 27, 28 mounted in the plugs extend downwardly within each of the passages 12, 13 substantially along the center lines thereof and into the bottom space 16. A stop valve (not shown) is placed in both the supply and discharge connecting lines of the conduit system near the water conditioner. If both of these valves are closed the plugs can be unscrewed for inspection of the magnesium rods and renewal when necessary.

The water conditioner can be connected in a water pipe system such that the water enters either at the top connection or the bottom connection. In either case the change in velocity and direction of the water flow through the conditioner will cause sufficient turbulence for efficient performance.

The body 11 of the water conditioner is formed of a metal which will act as the cathode of a galvanic couple set up between the anodic rods and the body 11. Accordingly, the material from which the body 11 is formed is metal having a large negative voltage in the electrolytic solution tendencies table. In the presently preferred embodiment a copper bearing metal is used. Thus, the water conditioner shown in the figures and described above provides a body portion 11 formed of copper bearing metal which can be threaded into intimate electrical contact with an iron pipe (not shown) of the water system. Magnesium rods 27, 28 are present within body 11 and present a large surface area of magnesium in contact with the water passing through the conditioner. The water, which acts as an electrolyte while passing through the conditioner is also in intimate contact with the large area of cathodic material forming the body portion of the conditioner. In addition, the magnesium rods are in intimate electrical or electron contact with the copper bearing metal of the body 11. The orientation of the anodic rods and the split passages 14 and 15 insure turbulence of the water passing through the conditioner. After sacrificial dissolution the rods 27 and 28 can be replaced by removing the plugs 23 and 24 from the body 11 and replaced as described hereinbefore.

Thus, the present invention provides anodic rods of magnesium in intimate and agitated contact with the water passing through the conditioner. The magnesium is in turn in intimate electrical contact with the copper bearing metal of the body of the device with which the water is also in contact. The copper bearing body is then connected to the iron pipes of the water conduit system.

The proximity of the large surface area of noncorrodible copper bearing metal to the magnesium metal insures a minimum of surface polarization, thus promoting dissolution of magnesium and maintenance of high net potential to protect the attached iron system. The net potential is sufficient to overcome electrical pipe joint resistances to protect the entire iron conduit system from corrosion. The high electron density on the copper bearing metal surfaces leads to a decrease in the oxygen content of the water and minimizes the possibility of iron corrosion in downstream parts of the water system.

By means of the method and device of the present invention, in addition to corrosion protection of an iron conduit water system, the chemical and physical composition of water passing through the apparatus of the present invention is also altered beneficially. This conditioning of the water in the system is achieved through the effects of increased magnesium ion concentration, the introduction of lyophilic colloids, the precipitation of other colloids, a decrease of acidity, de-oxygenation, and an alteration in the ratio of permanent to temporary hardness.

The magnesium anodes in the device of the present invention dissolve in water to release electrons and magnesium ions. This reaction occurs particularly rapidly in acidic waters and thus neutralizes acidity. The electrons pass to the copper bearing body 15 which is in turn mechanically and electrically connected to the piping system. The electrons combine with hydrogen ions available from the water and release hydrogen atoms and hydroxyl ions. The hydrogen ions in turn combine with themselves to form hydrogen gas or react with dissolved oxygen. The net effect is a reduction in oxygen content of the water and the introduction of hydroxyl ions to decrease the acidity of the water in contact with the copper bearing metal of the device and the attached piping system. The localized increase in alkalinity causes precipitation of the hydroxide of most metal ions which may be in the water. These hydroxides invariably are formed as finely divided, negatively charged gelatinous thixotropic suspensions called lyophilic colloids. Additionally the magnesium ions released from dissolution of the anodes form magnesium hydroxide which also is a lyophilic colloid.

Accordingly, the apparatus of the present invention introduces into the water collodial magnesium hydroxide, as well as other hydrous oxide colloids. The introduction of colloidal substances into the water of the system by means of the present invention will result in a decrease in odor of the water since most odorous substances in water are removed by sorption on a surface of lyophilic colloids.

The presence of the colloidal substances also brings about a decrease in soluble ion content of the water. In addition, the taste of the water is changed since materials absorbed in colloids do not have the same taste as when in a free state. Sedimentation is reduced since many natural waters form a sediment on standing due to coagulation of their content of coarse colloidal materials. It is a recognized fact that coagulation of colloids can be prevented by introduction of a protective colloid. In this instance the protective colloid is more finely divided and attaches itself to the coarse colloidal particles and prevents coagulation. The apparatus of the present invention introduces colloidally dispersed hydroxide which acts as a protective colloid and prevents coagulation of substances present in natural water, thus eliminating unsightly stains and maintaining clarity of the water which is particularly desirable in swimming pools, for example. Passage of water of the layer of magnesium hydroxide deposited on the magnesium anodes of the apparatus of the present invention tends to reduce undesirable temporary hardness through reaction of the hydroxide with carbon dioxide. Temporary hardness of water arises from a presence of calcium bicarbonate which easily decomposes on heating and deposits calcium carbonate. This reaction takes place readily in household hot water systems or industrial boilers and the deposited calcium carbonate forms hard crusts of lime in pipes and heating coils. Since these crusts are good heat insulators they reduced the efficiency of the heating plant, but more importantly, they often lead to complete failure of the system or even to explosion because of over-heating Magnesium hydroxide reacts with the temporary hardness and thus reduces or completely eliminates such temporary hardness. The magnesium and calcium carbonates form in the vicinity of the magnesium anodes and are gradually introduced into the water stream. Generally it is dispersed material which does not exhibit the crusting tendencies of substances deposited on heating surfaces.

Thus, the method and apparatus of the present invention provides protection against corrosion and also furnishes the maximum conditioning of water in a water conduit system.

What is claimed is:
1. A device for use in removably supporting a plurality of rods of a metallic material that includes magnesium in a position to treat water flowing through a first and a second tubular member, comprising: a rigid hollow body fabricated from an electrical conducting material in the form of a truncated isosceles triangle having first and second parallel tubular portions that are connected on the ends by two laterally separated tubular legs, said first portion being provided with first liquid conducting means that are removably connectible to said first tubular member, said second portion being provided with second liquid conducting means that are connectible to said second tubular member, said second portion having two laterally separated tapped bores formed therein that are axially aligned with said tubular legs, with the transverse cross-sectional area of each of said portions as well as that of said legs being at least as large as the smallest of said first and second liquid conducting means; two externally threaded plugs that removably engage said tapped bores, with each of said plugs having an outwardly extending recess formed in that end portion thereof disposed in said body, said recess being of such cross section as to frictionally engage an end portion of one of said rods to support same in a longitudinally extending position in one of said legs, with the transverse cross section of each of said rods being of such size relative to the interior transverse cross-sectional area of said leg in which it is disposed that a longitudinally extending annulus-shaped space is formed in each of said legs, with the combined transverse cross-sectional areas of said annulus-shaped spaces being at least as large as the smallest of said first and second liquid conducting means to permit unrestricted flow of water through said legs parallel to said rods after said water has been caused to assume a turbulent condition by impinging on an interiorly disposed section of said body after entering same through either said first or second liquid conducting means; and exteriorly disposed handle means on said plugs to permit the unscrewing thereof from said tapped bores to permit individual withdrawal of each of said rods from said body for inspection purposes without disconnecting said body from said first and second tubular members.

2. A device as defined in claim 1 wherein said legs taper outwardly from one another and said first and second liquid conducting means are oppositely projecting threaded tubular bosses.

3. A device as defined in claim 2 wherein said body and bosses are formed as an integral unit.

4. A method of treating water containing foreign material that tends to be deposited as a hard layer on a ferrous container into which said water is discharged to minimize such deposition, comprising the steps of:
  (a) discharging said water through at least one elongate passage that is at least partially defined by a first surface of a magnesium-containing material and a second surface of a copper-containing material, at a rate of flow of said water through said passage so that sufficient magnesium is dissolved therein to substantially reduce the oxygen content of said water thus forming gelatinous thixotropic suspensions with said foreign material therein to the extent that said foreign material is not deposited as a hard layer in said container;
  (b) maintaining said materials defining said first and second surfaces in electrical conducting engagement; and
  (c) maintaining said material defining said second surface in electrical conducting engagement with said ferrous container to effect galvanic couples between said first surface, said second surface, and said ferrous container.

5. A method as defined in claim 4 which includes the further step of maintaining the area of said second surface sufficiently large relative to the area of said first surface that such polarization as may occur during flow of water between said surfaces will not be sufficiently great as to lower the electromotive potential between said first surface and the combined surfaces of said second surface and the interior surface of said container to the extent that electromotive corrosion will take place on the interior surface of said container.

6. A device for concurrently protecting an iron surface against corrosion and treating water without destroying the potability thereof after said water flows from a first tubular member, including:
 (a) a second tubular member of iron in which the interior thereof defines said iron surface;
 (b) a hollow copper body, the exterior surface of which is exposed to the ambient atmosphere, said body having a water inlet, a water outlet, and an opening formed therein, which body serves the dual function of a cathode and a connection through which water can flow from said first to said second tubular member;
 (c) means for connecting one end of said first tubular member to said water inlet to permit water to discharge from said first tubular member into the interior of said body;
 (d) means for connecting one end of said tubular member to said water outlet with metal-to-metal contact to permit said second tubular member to receive water from the interior of said body;
 (e) a magnesium anode disposed in a fixed position within said body, which anode is shorter in length than the interior thereof and is spaced from the interior surface of said body to permit unobstructed flow of water through said body from said inlet to said outlet; and
 (f) a metal cover that removably engages said opening with metal-to-metal contact and grips said anode in metal-to-metal contact at a single section thereof to expose at least one end surface and substantially all of the side surfaces of said anode to water flowing through said body, said cover supporting said anode in said fixed position, with said cover and anode being adapted to be separated as a unit from said body for anode replenishing purposes while said body remains connected to said first and second tubular members, which anode when so supported in said fixed position, together with said cover and body, cooperatively define a galvanic cell from which an electric current flows directly to said second tubular member to maintain said iron surface at a sufficiently high voltage that it does not corrode due to transformation of said iron into the ionic state, with said magnesium going into solution as said water flows through said body to said second tubular member to reduce the oxygen content of said water and increase the hydroxyl ion content thereof to form gelatinous thixotropic suspensions with any foreign materials in said water, which suspensions tend to so remain and not be deposited as scale in said second tubular member.

References Cited

UNITED STATES PATENTS

| | | | |
|---|---|---|---|
| 528,318 | 10/1894 | Bailey | 204—248 |
| 2,058,370 | 10/1936 | Thompson | 204—197 |
| 2,358,981 | 9/1944 | Lattner | 204—197 |
| 2,415,576 | 2/1947 | Brown | 204—197 |
| 2,524,511 | 10/1950 | Butler | 204—248 |

FOREIGN PATENTS 1,113,212  11/1955  France.

JOHN H. MACK, *Primary Examiner.*

JOSEPH REBOLD, JOHN R. SPECK, MURRAY TILLMAN, *Examiners.*

T. TUNG, *Assistant Examiner.*